United States Patent [19]

Syracuse et al.

[11] 4,148,395
[45] Apr. 10, 1979

[54] ROLL PACKAGE

[75] Inventors: Carmelo R. L. Syracuse, East Rochester; Alan S. Chisek, Rochester, both of N.Y.

[73] Assignee: Eastman Kodak Company, Rochester, N.Y.

[21] Appl. No.: 857,729

[22] Filed: Dec. 5, 1977

[51] Int. Cl.$^2$ ............... B65D 85/67; B65D 85/671; B65D 85/672
[52] U.S. Cl. .................................................. 206/414
[58] Field of Search ............ 206/413, 414, 415, 416, 206/396, 395, 389, 410, 53, 316; 96/78; 252/235

[56] References Cited

U.S. PATENT DOCUMENTS

| | | | |
|---|---|---|---|
| 1,560,555 | 11/1925 | Flynn | 206/389 |
| 1,784,281 | 12/1930 | Fritts | 206/53 UX |
| 1,989,183 | 1/1935 | Blake | 206/414 |
| 2,883,045 | 4/1959 | Abramson | 206/396 |

FOREIGN PATENT DOCUMENTS 191046 9/1923 United Kingdom .................... 206/316

Primary Examiner—William T. Dixson, Jr.
Attorney, Agent, or Firm—M. S. Sales

[57] ABSTRACT

A package for a roll of light-sensitive strip material is disclosed and includes end covers and a leader which are opaque and moistureproof. A rim or peripheral lip on each end cover overlies an edge of the leader and is adhered thereto, but no adhesive is used between the end covers and the ends of the roll so that the edges of the strip material do not pick up adhesive. The assembled roll and its package may be roomlight loaded into exposure apparatus such as a camera, magazine, cassette, etc. with a portion of the leader extending from the roll. After the exposure apparatus has been sealed to light, the remainder of the leader may be stripped from the roll, tearing the end cover rims away from the rest of the end covers so that successive convolutions of strip material may be unwound from the roll.

5 Claims, 4 Drawing Figures

ROLL PACKAGE

BACKGROUND OF THE INVENTION

1. Field of the Invention

This invention relates to the packaging of bulk light-sensitive strip material such as photographic paper and film, and more particularly to the packaging of rolls of such material for roomlight loading.

2. Description of the Prior Art

Bulk rolls of light-sensitive strip material for professional use have generally been mounted on an inner core and individually packaged in light-opaque, moistureproof containers from which the rolls are removed for loading into exposure apparatus such as magazines, cassettes, camera supply chambers, etc. Such containers have customarily been formed of plastic or metal foil, and in some instances have been metal cans.

While such packaging is inexpensive and serves its intended purpose of keeping light and moisture from the contents during shipping and handling, it presents a problem when the strip material is to be loaded into the exposure apparatus (such as for example the cassette disclosed in U.S. Pat. No. 4,034,929 issued July 12, 1977). Once opened, the package is of course no longer light-tight, and since the contents must be removed from the package to be loaded into the apparatus, such loading must be done in dark conditions to prevent fogging the light-sensitive material.

Coassigned U.S. Pat. No. 2,797,804, which issued on July 2, 1957 to F. A. Pomeroy et al, discloses light and moisture protection for rolls of film which does permit roomlight loading. An opaque, moistureproof leader strip is attached to the leading end of the film in the roll, and the ends of the roll are convered by opaque, moistureproof material which is temporarily adhered to the roll ends by a pressure sensitive adhesive.

Such a package solves the problem associated with roomlight loading in that the roll may be inserted into the apparatus and a portion of the leader fed through the film path while sufficient leader remains convoluted around the film to provide a light barrier. However, as film is advanced from the roll, adhesive may peel away from the end covers and stick to the edges of the film. Should this occur, it is possible that the adhesive carried by the film could build up in the camera and cause contamination problems, or that the adhesive could be transmitted to the processing apparatus with similar adverse effects.

SUMMARY OF THE INVENTION

We have provided a package for a roll of light-sensitive strip material wherein the roll is protected from light and moisture and is readily loaded into exposure apparatus in roomlight conditions without the potential problem of adhesive contamination associated with the earlier mentioned prior art patent. Such a package includes a leader attached to the strip material and convoluted around the roll. The leader, as well as a pair of roll end covers, is opaque and moistureproof. A rim or peripheral lip on each end cover is folded over the lateral edge of the leader and is adhered thereto. While adhesive may also seal the inner portion of each end cover to the roll core, no adhesive is used between the end covers and the ends of the strip material which forms the roll. When loaded into the exposure apparatus and before the apparatus has been sealed from roomlight, the outer end of the leader may be threaded through the film path without destroying the light integrity of the package. Once the apparatus has been closed to light, additional leader may be removed from the roll, tearing the rim from the end covers and finally pulling the film through the film path.

In a preferred embodiment of the present invention, slits may be provided in the end cover rims to insure that they are easily torn by the leader. For the same reason, the leader is preferably formed of a stronger material than the end cover rims.

The invention and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENT

Figure 1:
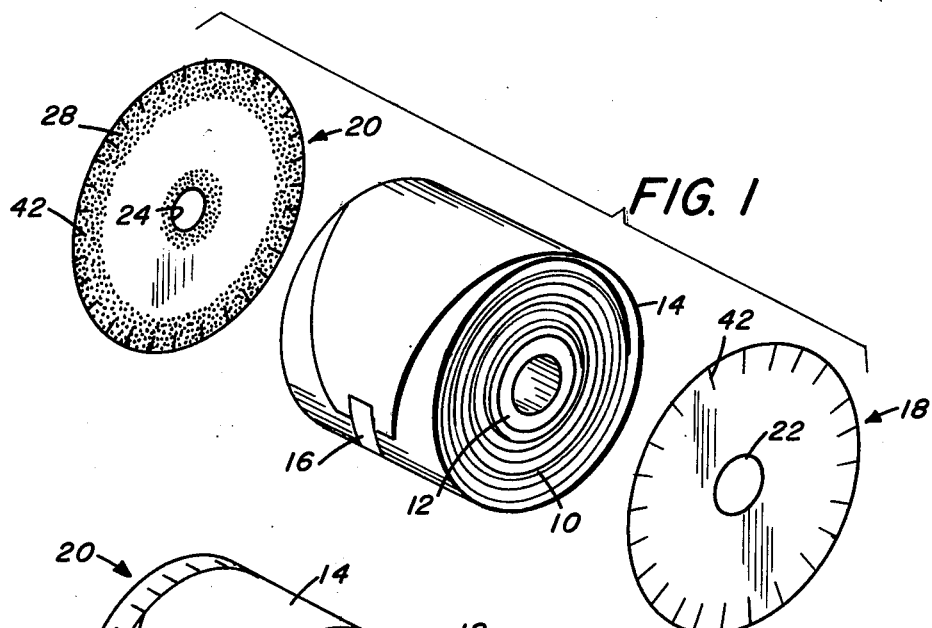
FIG. 1 is an exploded perspective view of a roll of photosensitive material or the like having a protective package including a leader and two end covers.
Figure 2:
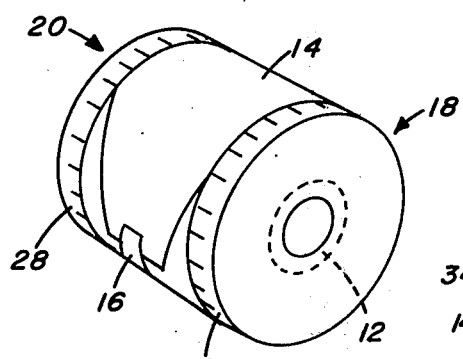
FIG. 2 is a perspective view of the assembled roll and package of FIG. 1.

Referring to FIG. 1, a conventional roll 10 of light-sensitive material such as photographic paper or film is coiled about a hub or supporting inner core 12. A leader 14 of opaque, moistureproof material such as for example 5 mil, black carbon pigmented film base, is attached to the outer end of the roll material and is wound about the coil. A carbon concentration in the leader film base of from about 1.15% to 1.75% has been found to be satisfactory, as has Kodak Estar support for the leader film base itself. Of course, many other suitable leader materials will readily occur to those skilled in the art, depending upon the conditions from which the roll is to be protected. In the case of a roll of photosensitive film, such conditions would most commonly be actinic radiation and moisture.

The outer-most end of leader 14 has been cut back to form a generally reduced width area, shown as a tapered end in the preferred embodiment. The end of the leader is temporarily secured by a piece of tape 16 or other convenient means which can be readily released.

A pair of continuous end covers 18 and 20 are provided to close the ends of the roll. A hole 22 and 24 may be provided in the center of each end cover and would preferably have a size similar to the inner diameter of core 12. The end covers are of greater outside diameter than the roll leader combination so as to provide rims or peripheral lip areas 26 and 28 to be folded over the circumference of the roll.

As is leader 14, end covers 18 and 20 are opaque and moistureproof. Preferably, for reasons to be discussed hereinafter, the end cover material is more easily torn than that of leader 14. A suitable end cover material may, for example, be a laminate of 0.00035 inch aluminum foil laminated on both sides to a half-mil polyester film sheet using black adhesive as a laminate.

An adhesive material is applied to the inner surface of each peripheral lip area 26 and 28. If a hole is provided in the end covers, such as shown in the preferred embodiment, adhesive is also applied to the end covers about the hole; but only in the area which will overlie the sides of inner core 12. In this manner, the end covers will be sealed to core 12 and leader 14 along the covers' inner and outer peripheries, but will not be adhered to the edges of the coiled strip material. Alternatively, adhesive may be applied to the entire end covers but heat sealed in only those areas specified.

Although any suitable adhesive may be used, UPACO 1921-634 and Eastobond A-298 hot melt adhesives have been successfully employed with the leader and end cover materials identified hereinbefore. Of course other bonding means, such as for example pressure sensitive, may be considered instead of adhesive bonding.

Figure 3:
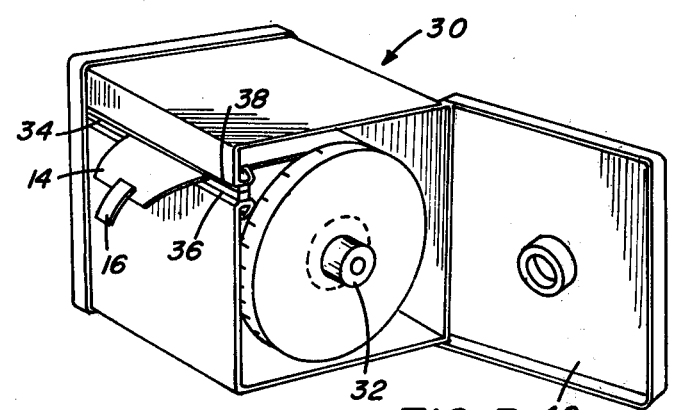
FIG. 3 is a perspective view of the assembled roll and package of FIG. 2 loaded into a film magazine.
Figure 4:
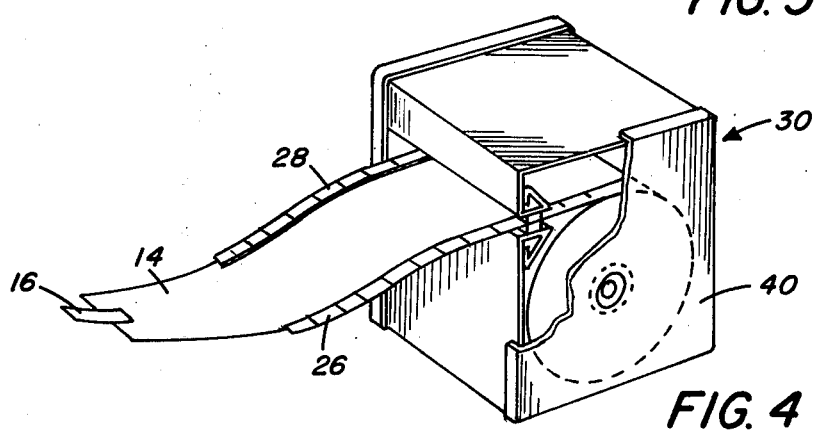
FIG. 4 is a perspective view similar to FIG. 3 with the magazine door closed and partially broken away to show the effect of pulling the leader from the roll.

In FIGS. 3 and 4, we have shown one mode of using a roll packaged in accordance with the present invention. Tape 16 is pulled off the leader so that the innermost convolution of leader is free. Note that sufficient leader remains around the roll to provide a light seal and to keep rims 26 and 28 in tack. The roll and package is inserted into a conventional magazine 30 such that a spindle 32 in the magazine extends through the roll's inner core 12, and such that the free end of leader 14 extends through a slit 34 in the magazine. The slit is lined with a pair of foam or felt pads 36 and 38 to provide a light seal.

After a door 40 is closed to complete the light-tightness of magazine 30, leader 14 may be further pulled through slot 34. As the leader unwinds from the roll, it will begin to tear rims 26 and 28 from end covers 18 and 20, respectively. A plurality of slits 42 extend from the edges of rims 26 and 28 to assist such tearing by providing tear-starting places. The slits do not extend completely to the edge of the roll because it is not necessary and because of light seal considerations. Although one slit for each end cover would be sufficient if it were properly positioned about the roll's circumference, a plurality of slits are provided in the preferred embodiment because of the uncertainty of angular orientation of the end covers during assembly.

When the leader is completely unwound from the roll, it will have torn both rims 26 and 28 from end covers 18 and 20, respectively. If magazine 30 has been attached to some end use mechanism such as for example a camera, the strip material may now be withdrawn from the roll and fed into the mechanism.

It should now be apparent that the present invention includes unique structure possessing important advantages not available from or taught by the prior art. A package for a roll of light-sensitive strip material is provided, wherein the roll is protected from light and moisture and is readily loaded into exposure apparatus in roomlight conditions.

The invention has been described in detail with particular reference to a certain preferred embodiment thereof, but it will be understood that variations and modifications can be effected within the spirit and scope of the invention.

We claim:

1. In a package for a roll of light-sensitive strip material coiled on a supporting inner core in convolutions of increasing radius and having generally flat end surfaces, the improvement comprising:
    an end cover for each end surface of the roll, each of said end covers (1) overlying at least a portion of the inner core and extending radially outwardly to the outer convolutions of the roll and (2) defining an imperferate, light-tight end cap at least between the inner core and said outer convolutions;
    a rim on each end cover folded over the roll circumference and extending axially inwardly of the end surface, said rims (1) cooperating with said outer convolutions and said end caps to enclose said roll of strip material, and (2) having slits extending from the edge of each rim generally axially of the roll toward, but terminating short of, the end surface of the roll; and
    means located on at least said rims and on the region of said end caps overlying the inner core for securing said rims to said outer convolutions and said inner core, said end caps being unsecured to the roll convolutions between said core and said outer convolutions.

2. In a package for a roll of light sensitive strip material coiled in convolutions of increasing radius and having generally flat end surfaces, the improvement comprising:
    an end cover for each end surface of the roll;
    a rim on each end cover folded over the roll circumference and extending axially inwardly of the end surfaces;
    adhesive on said rims between said rims and the roll circumference; and
    slits in said rims extending from the edges of said rims generally axially of the roll toward, but terminating short of, the end surfaces of the roll.

3. In a package for a roll of strip material coiled in convolutions of increasing radius and having generally flat end surfaces, the improvement comprising:
    a leader forming at least the outer convolution of the roll, said leader having a section of reduced width;
    an end cover for each end surface of the roll;
    a rim on said end covers folded over the roll circumference and extending axially inwardly of the end surfaces but terminating axially outwardly of said leader at its reduced width section; and
    slits in said rims extending from the edge of said rims generally axially of the roll toward, but terminating short of, the end surface of the roll.

4. The improvement as defined in claim 3 wherein said leader is opaque.

5. The improvement as defined in claim 3 wherein the material of said end covers is more easily torn than the material of said leader.

* * * * *